(12) United States Patent
Sugahara et al.

(10) Patent No.: US 11,082,711 B2
(45) Date of Patent: Aug. 3, 2021

(54) IMAGE CODING DEVICE, IMAGE CODING METHOD, AND IMAGE FALSIFICATION IDENTIFICATION PROGRAM

(71) Applicant: JVC KENWOOD Corporation, Yokohama (JP)

(72) Inventors: Takayuki Sugahara, Yokohama (JP); Masaki Goto, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 50 days.

(21) Appl. No.: 16/430,470

(22) Filed: Jun. 4, 2019

(65) Prior Publication Data
US 2019/0379899 A1 Dec. 12, 2019

(30) Foreign Application Priority Data
Jun. 6, 2018 (JP) .............................. JP2018-108203

(51) Int. Cl.
*H04N 19/467* (2014.01)
*H04N 19/176* (2014.01)
(Continued)

(52) U.S. Cl.
CPC ......... *H04N 19/467* (2014.11); *G06T 1/0042* (2013.01); *H04N 1/32277* (2013.01);
(Continued)

(58) Field of Classification Search
CPC .. H04N 19/467; H04N 19/124; H04N 19/137; H04N 19/176; H04N 1/32277; H04N 1/32331; H04N 1/32144; H04N 21/8358; H04N 21/23892; H04N 2201/3233; H04N 2005/91335;
(Continued)

(56) References Cited

U.S. PATENT DOCUMENTS

| | | | |
|---|---|---|---|
| 7,159,117 B2 * | 1/2007 | Tanaka ................... | G06T 1/0028 375/E7.089 |
| 10,594,689 B1 * | 3/2020 | Weaver ................. | H04L 9/3247 |

(Continued)

FOREIGN PATENT DOCUMENTS

JP 2004364263 A 12/2004

OTHER PUBLICATIONS

IEEE Transactions on Consumer Electronics, vol. 45, No. 2, May 1999 A watermarking technique based on one-way hash functions by Hwang et al. (Year: 1999).*

(Continued)

*Primary Examiner* — Bernard Krasnic
(74) *Attorney, Agent, or Firm* — Brundidge & Stanger, P.C.

(57) ABSTRACT

An image coding device adapted to code time-continuous pictures is provided. An embedding position information conversion unit acquires embedding position information indicating a position in a picture, by using a one-way function based on time-continuous information. An image coding unit selects a coding block in the picture based on the embedding position information, embeds electronic watermark information in a coding parameter used to code the coding block, and codes the coding block by using the coding parameter in which the electronic watermark information is embedded.

6 Claims, 10 Drawing Sheets

(51) Int. Cl.
  *H04N 19/137* (2014.01)
  *H04N 1/32* (2006.01)
  *G06T 1/00* (2006.01)
  *H04N 19/124* (2014.01)

(52) U.S. Cl.
  CPC ....... *H04N 1/32331* (2013.01); *H04N 19/124* (2014.11); *H04N 19/137* (2014.11); *H04N 19/176* (2014.11)

(58) Field of Classification Search
  CPC ... G06T 1/0042; G06T 1/0057; G06T 1/0021; G06T 2201/0051; G06T 2201/0052; G06T 2201/0053; G06T 2201/0061; G06T 2201/0062; G06T 2201/0065; G06T 2201/0203; G06T 2201/0601; G06F 2221/0733; G10H 2240/041; G11B 20/00289; G11B 20/00884
  See application file for complete search history.

(56) References Cited

U.S. PATENT DOCUMENTS

| | | | |
|---|---|---|---|
| 2003/0070075 A1* | 4/2003 | Deguillaume | G06T 1/0064 713/176 |
| 2003/0128861 A1* | 7/2003 | Rhoads | G06F 21/00 382/100 |
| 2003/0133591 A1* | 7/2003 | Watanabe | G06T 1/0028 382/100 |
| 2005/0053239 A1* | 3/2005 | Nomizu | H04N 21/8358 380/220 |

OTHER PUBLICATIONS

ISO/IEC JTC1/SC29/WG11 MPEG97, Jul. 1997 Proposal of a watermarking technique for hiding/retrieving data in compressed and decompressed video by Kutter et al. (Year: 1997).*
2008 International conference on computer science and software engineering A video watermarking scheme based on motion vectors and mode selection by Zhendong et al. (Year: 2008).*

* cited by examiner

IMAGE CODING DEVICE, IMAGE CODING METHOD, AND IMAGE FALSIFICATION IDENTIFICATION PROGRAM

BACKGROUND OF THE INVENTION

1. Field of the Invention

The present invention relates to an image coding technology adapted to embed an electronic watermark in an image and coding the resultant image and to an image falsification identification technology that uses an electronic watermark.

2. Description of the Related Art

FIG. 6 shows a configuration of a related-art coding device 100 adapted to code images according to the MPEG coding scheme. A brief description will be given. The time redundant portion of an input image signal is removed by using a difference detector 2 to find a difference from an image signal decoded by a motion compensation predictor 1. Three modes of prediction direction, namely, past, future, and bidirectional, are available. The prediction direction can be switched into use for each macro block (MB) of 16×16 pixels. The prediction direction is determined by the picture type assigned to the input signal.

For motion compensation in the motion compensation predictor 1, a motion vector is detected between the input image signal and a reference image signal from an image memory 11. A prediction is made by shifting the image by an amount determined by the motion. A motion vector in the horizontal direction or in the vertical direction is transmitted as additional information added to the MB along with a motion compensation (MC) mode indicating from where the prediction is made.

A differential image signal output from the difference detector 2 is subject to discrete cosine transform in a DCT unit 3 to be turned into DCT coefficients.

Image data subjected to DCT (DCT coefficients) is quantized by a quantizer 4.

The data quantized by the quantizer 4 is turned into a variable length code (VLC) by a VLC unit 5.

The data turned into a variable length code by the VLC unit 5 is temporarily stored in a buffer 6 before being output as coded data at a predetermined transfer rate. The volume of codes generated for each MB in the output coded data is supplied to a code volume controller 7, where an error code volume between a target code volume and the generated code volume is identified. The code volume is controlled by feeding the error code volume back to the quantizer 4 for adjustment of the quantization scale.

The image data quantized by the quantizer 4 is subject to inverse quantization by an inverse quantizer 8. The resultant data is further subject to inverse DCT by an inverse DCT unit 9 before being temporarily stored in the image memory 11 via an adder 10. The motion compensation predictor 1 uses the signal stored in the image memory 11 as a reference decoded image (reference image) for motion compensation in an input image signal.

FIG. 7 shows a configuration of a decoding device 110 adapted to decode coded data subjected to MPEG coding by the coding device 100 of FIG. 6. The coded data (stream) is buffered in a buffer 13 before being input to an VLD unit 14. The VLD unit 14 performs variable length decoding.

The data output from the VLD unit 14 is input to an inverse quantizer 15 for inverse quantization. The data subjected to inverse quantization is input to an inverse DCT unit 16 for inverse DCT. The resultant data is added in an adder to a signal from a motion compensation predictor 18, and the sum is output as image data (decoded data). The decoded data is temporarily stored in an image memory 19 and is used in the motion compensation predictor 18 as a reference decoded image (reference image) to calculate a differential image that represents a difference from the data from the VLD unit 14.

Nowadays, a new coding standard called H264 (AVC) twice or more as efficient as MPEG2 is available. A coding scheme (H265) called high efficiency video coding (HEVC) created from further technological advancement for improving the coding efficiency has also been available for use. HEVC offers a compression performance about twice as high as AVC and about four times as high as MPEG2. In particular, HEVC exhibits excellent compression performance for high-resolution images such as those of HDTV or UHDTV.

In HEVC, a novel and advanced algorithm is introduced in the following three technical aspects (1)-(3).

(1) Coding Block

A coding tree unit (CTU) with a selectable size is introduced as a coding block (a basic processing unit in coding) in place of a macro block of a fixed size. The maximum CTU size in HEVC is 64×64, and CTUs are processed in the order of raster scan. A block can be segmented recursively in quadtree segmentation with a given CTU at a starting point. Motion compensation prediction, intra prediction, and transform processing can be performed in an optimized manner by selecting a large block size in a monotonous area and selecting a block size suited to a signal change in an area characterized by a complicated shape or signal change. Not only a square but also a rectangle can be selected as the shape of a block.

(2) Coding of Motion Parameter

The merge mode employed in HEVC reduces coded data for a motion parameter by integrating a block with a neighboring block with the same motion parameter. Since areas with the same background or moving object exhibit the same movement, the code volume of a motion parameter can be reduced. Motion vector prediction itself has been practiced in the related art. MPEG-2 offers selection of only one vector as a candidate for prediction, and AVC offers selection from three neighboring vectors. Meanwhile, HEVC offers selection from five neighboring vectors and delivers a higher prediction efficiency.

(3) Prediction Mode

In an expansion from the related-art schemes, HEVC offers selection from 35 types of modes and delivers significantly improved performance in prediction processes. Adaptive block size and expansion of intra prediction modes have resulted in significantly improved performance of intra frame predictive coding of HEVC. Performance beyond JPEG2000 has been verified.

[Patent Document 1] JP2004-364263

Data recorded in a recorder such as a drive recorder by using a coding scheme such as that described above is often used, due to its nature as recorded image, as investigative information collected by the police or an evidence presented at a court for police investigation or court judgment on automobile accidents or crimes at parking areas. Meanwhile, it is relatively easy to make a falsification by, for example, rewriting the image represented by the data. In other words, the "originality/intactness as recorded" of data submitted to the police or the court is open to question. In this background, a scheme capable of scientifically demonstrating that falsification has not been made has been called for.

SUMMARY OF THE INVENTION

The embodiments address the above-described issue, and a general purpose thereof is to provide an image coding technology capable of safely embedding an electronic watermark in moving images and coding the moving images, and a technology capable of identifying falsification of an image properly by using an electronic watermark.

An image coding device according to an embodiment is adapted to code time-continuous pictures, and includes: an embedding position information conversion unit (24) that acquires embedding position information indicating a position in a picture, by using a one-way function based on time-continuous information; and a coding unit (27) that selects a coding block in the picture based on the embedding position information, embeds electronic watermark information in a coding parameter used to code the coding block, and codes the coding block by using the coding parameter in which the electronic watermark information is embedded.

Another embodiment of the present invention relates to an image coding method. The method is adapted to code time-continuous pictures and includes: acquiring an embedding position information conversion unit indicating a position in a picture, by using a one-way function based on time-continuous information; selecting a coding block in the picture based on the embedding position information, embedding electronic watermark information in a coding parameter used to code the coding block, and coding the coding block by using the coding parameter in which the electronic watermark information is embedded.

Still another embodiment of the present invention relates to an image falsification identification program. The program is adapted to decode a picture from a coded bitstream in which time-continuous pictures are coded and detect electronic watermark information, and to identify whether falsification has been made, the image falsification identification program comprising computer-implemented modules including: an embedding position information conversion module that acquires embedding position information indicating a position in a picture, by using a one-way function based on time-continuous information acquired from the picture; an electronic watermark information extraction module that selects a coding block in the picture based on the embedding position information and extracts the electronic watermark information from a coding parameter used to code the coding block; and a comparison and determination module that determines whether the picture has been falsified by comparing the extracted electronic watermark information with reference information.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
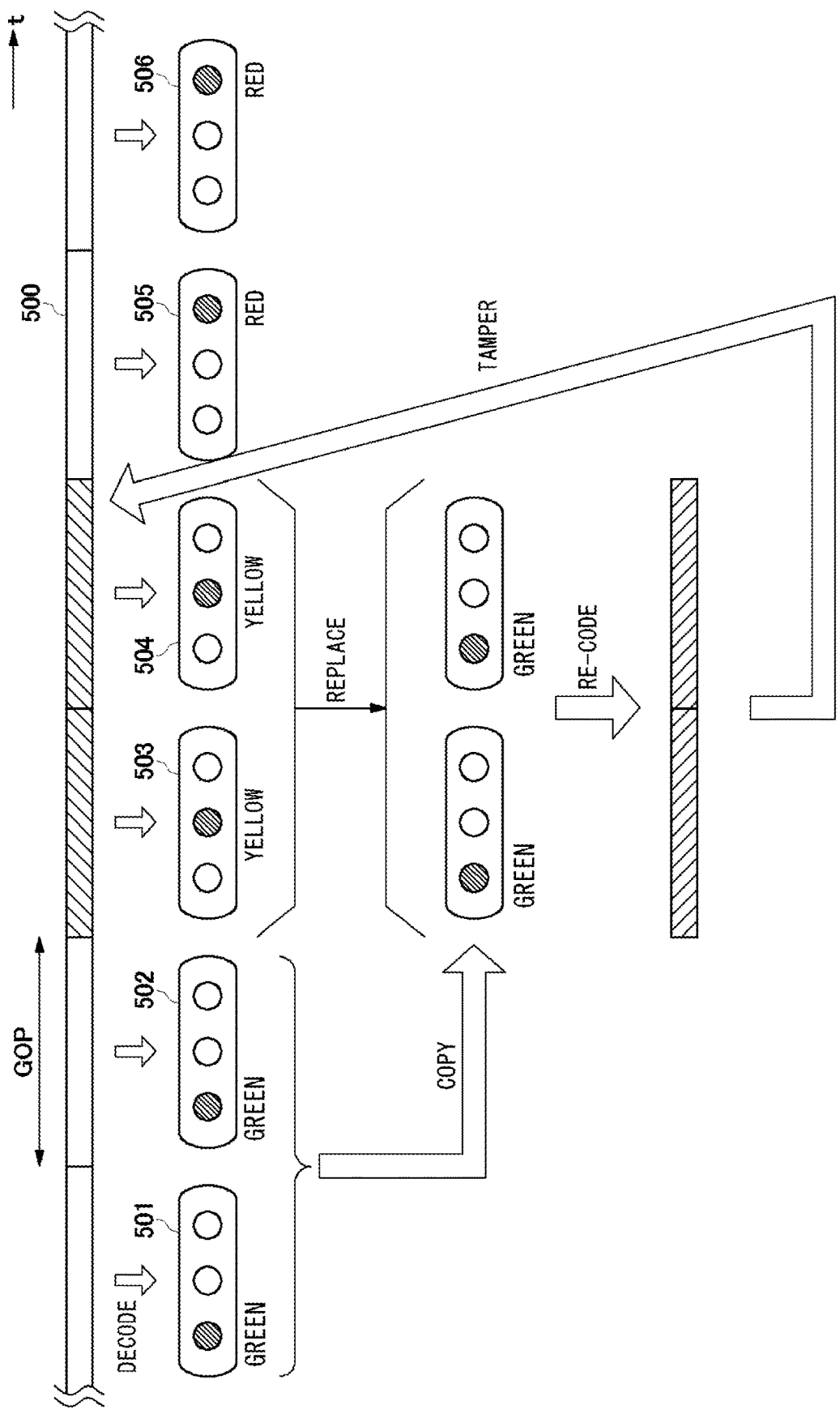
FIG. 1 illustrates falsification or editing of a coded bitstream.

A method of generating time sequence information on frame images and embedding the time sequence information as an electronic watermark in moving image data in an invisible manner will be described with reference to FIG. 1. To simplify the explanation, it is assumed that a coded data bitstream 500 of FIG. 1 carries an image of a traffic light including green, yellow, and red lamps arranged in the horizontal direction. It is assumed that the content of the illustrated coded data bitstream is a video scene showing a change from "green" to "red" via "yellow" in the temporal direction. As shown in FIG. 1, when the coded data bitstream 500 is decoded, an image of a green traffic light (numerals 501, 502), an image of a yellow traffic light (numerals 503, 504), and an image of a red traffic light (numerals 505, 506) are obtained in the stated order. Characteristically, it is easy to edit MPEG images in units of GOPS that include intra images in which coding is completed within the frame. If a portion of the image of a yellow traffic light (numerals 503, 504) is edited conveniently by using image editing software to change a yellow signal to a green signal, falsification can be detected by electronic watermark data. However, if an image of a green traffic light (numerals 501, 502) is copied to substitute for an image of a yellow traffic light (numerals 503, 504) and is then re-coded, and if the re-coded data is returned to where the scene of the yellow traffic light originally was (two GOPs), the electronic watermark remains unchanged, and it is impossible to detect falsification according to the presence or absence of an electronic watermark. The original content was a scene showing a change from "green" to "red" via "yellow", but the falsified scene shows a change from "green" to "red" via "green". A change of a signal from "green" to "red" that bypasses "yellow" is against the common sense and so it is semantically clear that falsification has been made. If the images are edited to, for example, delete a motorcycle at a traffic intersection instead of to change a signal, however, semantic distinction cannot be made. In other words, this MPEG moving image data would be open to question unless scientifically authenticated.

Figure 2:
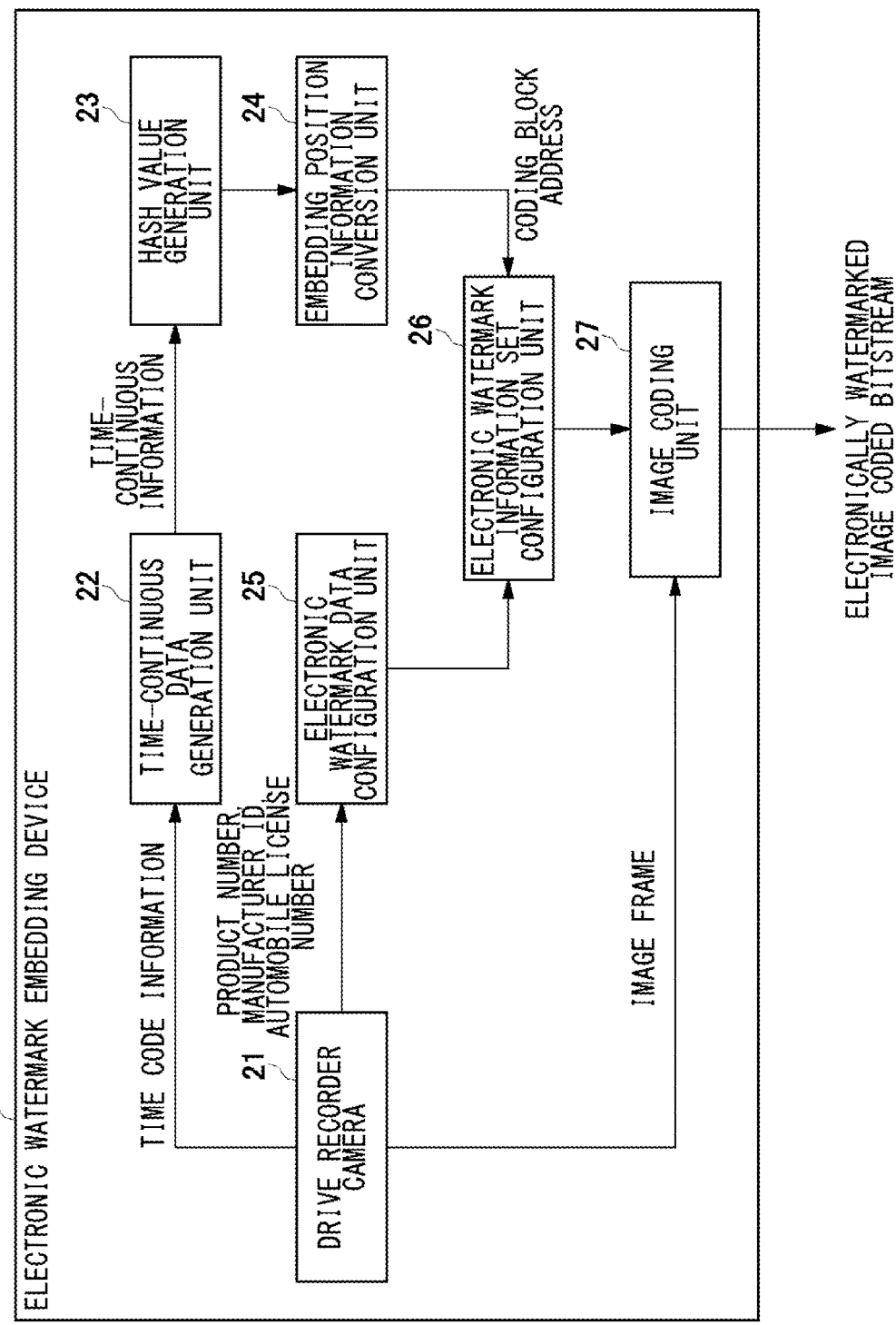
FIG. 2 shows a configuration of an electronic watermark embedding device according to an embodiment.

FIG. 2 shows a configuration of an electronic watermark embedding device 200 according to an embodiment of the present invention. The electronic watermark embedding device 200 is exemplified by, but not limited to, a vehicle-mounted recording device (drive recorder). The following description assumes that an image input to the electronic watermark embedding device 200 is an image of a scene outside captured by a camera of the vehicle-mounted recording device.

The electronic watermark embedding device 200 includes a drive recorder camera 21, a time-continuous data generation unit 22, a hash value generation unit 23, an embedding position information conversion unit 24, an electronic watermark data configuration unit 25, an electronic watermark information set configuration unit 26, and an image coding unit 27.

The drive recorder camera 21 is provided to face a space in front of an automobile. An automobile captures an image of various traffic conditions on a road in front while traveling. In the event that a value detected by an acceleration sensor or the like inside a drive recorder exceeds a threshold value or in the event of a sudden braking or an abrupt steering, the drive recorder determines that an accident or a collision occurs. The drive recorder codes images captured during the travel and records the images in a memory. For example, images recorded for 10 seconds before and 1 minute after the accident (70 seconds in total) are coded and recorded.

The drive recorder camera 21 supplies time code information synchronized with the captured images to the time-continuous data generation unit 22. The drive recorder camera 21 supplies identification information such as the product number of the drive recorder, the manufacturer ID, and the license number of the automobile to the electronic watermark data configuration unit 25. The drive recorder camera 21 supplies the frames of captured images to the image coding unit 27.

The time-continuous data generation unit 22 generates time-continuous information based on the time code information synchronized with the images. The time-continuous data generation unit 22 incrementally counts continuous numbers using the frame numbers of coded pictures, regardless of the frame frequency. For example, given that the numeral (e.g. frame number) associated with the first frame is 0×00000000, 0×00000001 may be assigned to the next frame. The time-continuous data generation unit 22 supplies the incrementally counted number (assumed to comprise 32 bits in this case) to the hash value generation unit 23 as the time-continuous information. The time-continuous information may be any information that varies over time and need not necessarily be monotonously increasing or decreasing values. Any numerical value that varies constantly in accordance with a certain rule will serve the purpose. The user of time-continuous information makes it possible to detect falsification made by replacing frames in the images, by detecting that the time continuity is lost.

The hash value generation unit 23 refers to a hash table by using the time-continuous information as a key and outputs a hash value. The hash value is output from a hash function in the form of a predetermined bit series. It is assumed here that hash values with the same bit count are output.

The hash value generation unit 23 uses the input time-continuous information as an input value of the hash function and uses the hash function to convert the time-continuous information into, in this case, a 32-bit hash value. It is desired that the hash function is a cryptographically safe one-way function. It is desired that a function such as SHA-2 for which collision has not been discovered be used. The hash value generation unit 23 supplies the generated hash value to the embedding position information conversion unit 24.

The embedding position information conversion unit 24 converts a part of the input hash value into a coding block address. The coding block address is embedding position information in an image for identifying a coding block in the image.

Figure 8A:
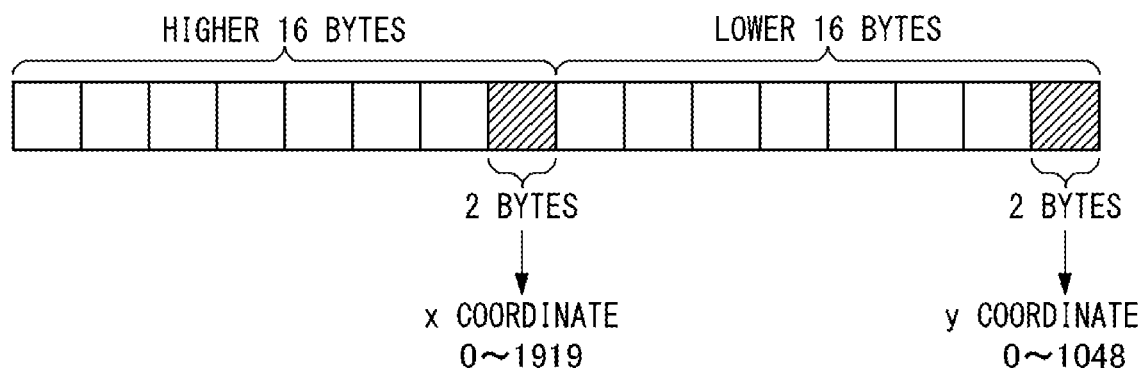
FIGS. 8A and 8B are conceptual diagrams that illustrate a position of embedding an electronic watermark.

The case of embedding 240-bit electronic watermark information in a HDTV image of 1920 pixels×1080 pixels will be described by way of example. SHA-256, which is a standard for 256-bit output of SHA-2, is used to split the 256 bits (32 bytes) of the output value into the higher/lower 16 bytes as shown in FIG. 8A. The lower 2 bytes in the higher 16 bytes are associated with the x coordinate, and the x coordinate value is obtained by performing a remainder operation using 1920 as a modulus. The lower 2 bytes in the lower 16 bytes are associated with the y coordinate, and the y coordinate value is obtained by performing a remainder operation using 1048 as a modulus.

The address of the coding block in the HDTV image of 1920 pixels×1080 pixels where the electronic watermark is embedded is obtained by using the x coordinate value and the y coordinate value thus obtained. More specifically, the coding block of 16 pixels×16 pixels including the pixel (numeral 510) indicated by the x coordinate value and the y coordinate value thus obtained is identified. The number assigned to the next coding block (numeral 512) in the raster order is obtained as the embedding position information. The embedding position information conversion unit 24 supplies the embedding position information, i.e., the coding block address, thus obtained to the electronic watermark information set configuration unit 26.

Figure 8B:
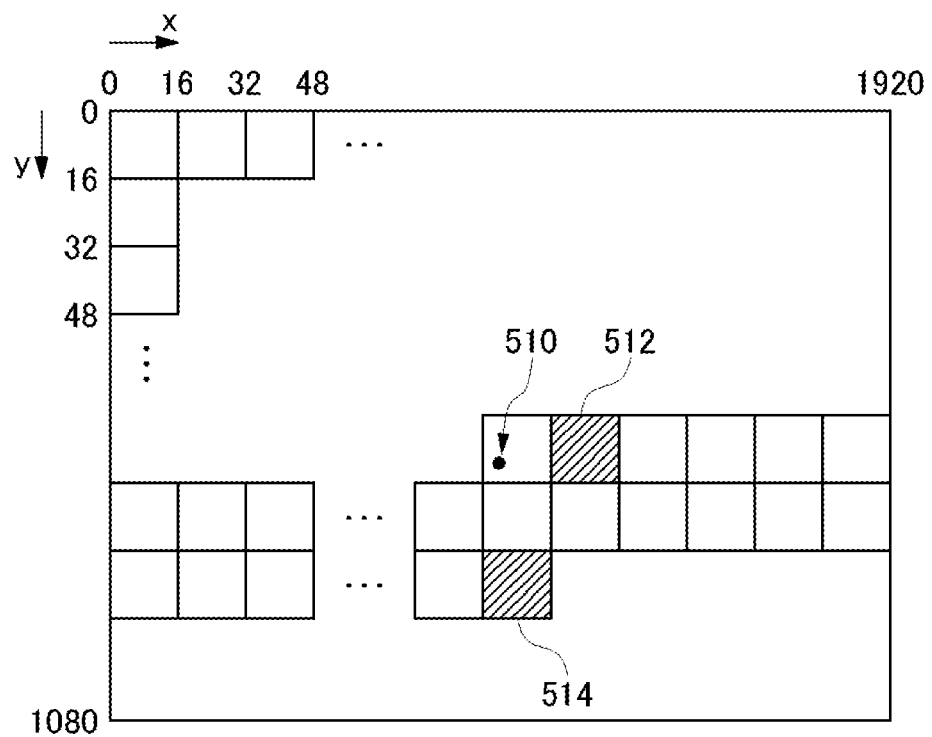

The coding block (numeral 512) identified by the embedding position information is defined as the first target of embedding. A predetermined number of coding blocks are selected as targets of embedding electronic watermark information in the order of raster scan based on a predetermined rule. The electronic watermark information is embedded in the coding parameter of each coding block. In this case, 1-bit electronic watermark information is embedded in the coding parameter of each coding block. In the case of embedding 240-bit electronic watermark information, 240 coding blocks are necessary as targets of embedding. Referring to FIG. 8B, the coding block denoted by numeral 514 is the last target of embedding.

Figure 9A:
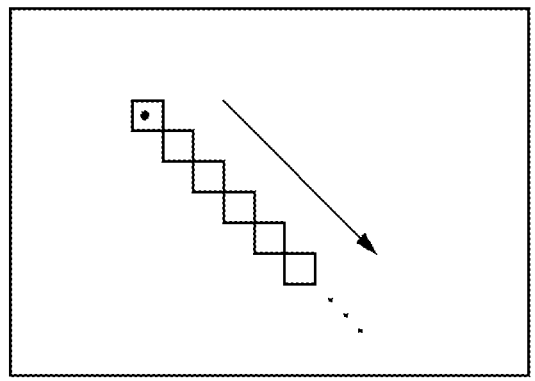
FIGS. 9A, 9B, and 9C show blocks in which an electronic watermark is embedded.
Figure 9B:
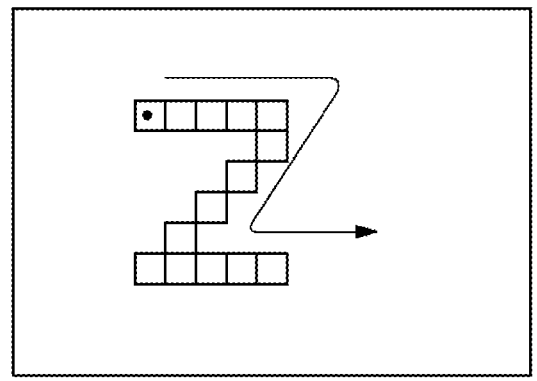
Figure 9C:
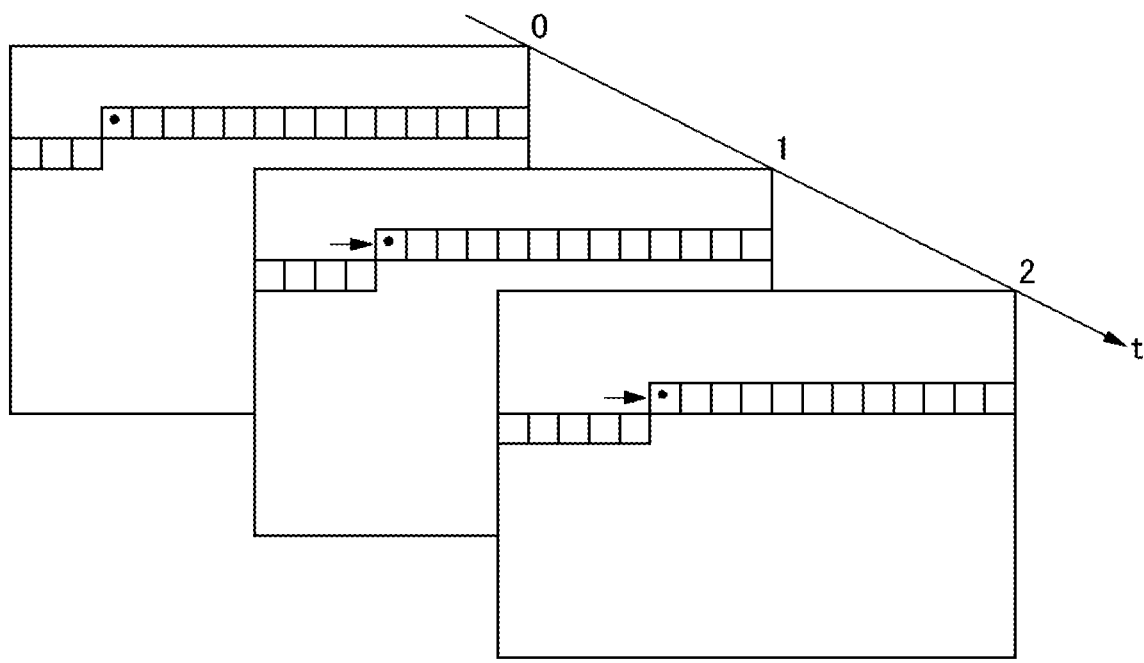

The method of selecting 240 coding blocks in the raster order is predetermined. Various rules are conceivable. For example, as shown in FIG. 9A, the coding block identified by the embedding position information may be the first target of embedding, and the remaining 239 coding blocks diagonally to the right and below may be sequentially selected as targets of embedding. Alternatively, coding blocks targeted for embedding may be selected in a sequence shaped in letter Z as shown in FIG. 9B.

In the case the information is embedded across a plurality of frames, the coding block in the first picture identified by the embedding position information obtained from the hash function may be defined as the first target of embedding. In the next picture, the coding block shifted by one in the raster order may be defined as the first target of embedding, and the same may hold true of the subsequent pictures. The time information may be detected not only in the first picture but also in each of the subsequent pictures and input to the hash function to obtain the embedding position information. In this way, the embedding position can be changed from picture to picture. In this case, a safer electronic water embedding method results. The hash value may be obtained from the time information in units of groups of pictures (GOP), which is a feature unique to MPEG, to change the embedding position. The embedding position may be shifted by one block in the raster order as the stream proceeds from one picture to another in a given GOP.

By using the time axis in addition to the X axis and the Y axis within the picture plane in this way, variations of 240 embedding positions can be determined three-dimensionally according to an arbitrary rule. In any case, using time-continuous information in units of pictures or in units of GOPs allows random changes in the embedding position and so realizes an extremely safe electronic watermark embedding method.

A description will be given of a reason for performing a remainder operation using 1048 as a modulus in determining the y coordinate value of the embedding position. In a HDTV image of 1920 pixels×1080 pixels, a total of 120 coding blocks of 16 pixels×16 pixels are arranged in the X axis direction. Embedding 240-bit electronic watermark information requires 240 coding blocks, which translates into 2 block lines, i.e., 32 lines in the Y axis direction. Subtracting 32 lines from the 1080 lines in the Y axis direction results in 1048 lines. By performing a remainder operation using 1048 as a modulus to determine the y coordinate value, at least 2 block lines are secured. In this way, 240 blocks starting at the coding block next to the coding block identified by the x coordinate value and the y coordinate value obtained by the above-described remainder operation are selected in the raster order in the HDTV image.

Defining a macro block of 16 pixels×16 pixels as a coding block, the vertical 1080 pixels in a HDTV image of 1920 pixels×1080 pixels cannot be divided by 16 so that 1088 pixels resulting from adding 8 pixels to the vertical 1080 pixels are coded. In other words, 1920×1088/256=8160 macroblocks are located in a HDTV image of 1920 pixels× 1080 pixels.

Meanwhile, the drive recorder camera 21 supplies identification information, such as the product number information on the product, the manufacturer name, and the license number of the automobile in which the drive recorder is provided, to the electronic watermark data configuration unit 25. For example, the product number information on the product may be JKC-0777, and the manufacturer name may be JVCKENWOOD.

The user is prompted to enter the license number of the automobile in which the drive recorder is provided, using the GUI, such as a menu, of the drive recorder. The user is alerted of collection of personal information to ensure that the license number of the automobile is entered voluntarily by the owner of the automobile. The information on the license number of the automobile is, for example, information like "ABCDEF5678".

The electronic watermark data configuration unit 25 turns the identification information into a binary form to configure electronic watermark data. In the case of "JKC-0777 JVCK-ENWOOD ABCDEF5678", for example, the identification information is converted into 30-byte (240 bits) binary data. The electronic watermark data configuration unit 25 supplies the electronic watermark data to the electronic watermark information set configuration unit 26.

The electronic watermark information set configuration unit 26 acquires the coding block address from the embedding position information conversion unit 24 and acquires the electronic watermark data from the electronic watermark data configuration unit 25. The electronic watermark information set configuration unit 26 links the stuff bits, the coding block address, and the electronic watermark data to configure electronic watermark information set and supplies the set to the image coding unit 27.

Figure 10:
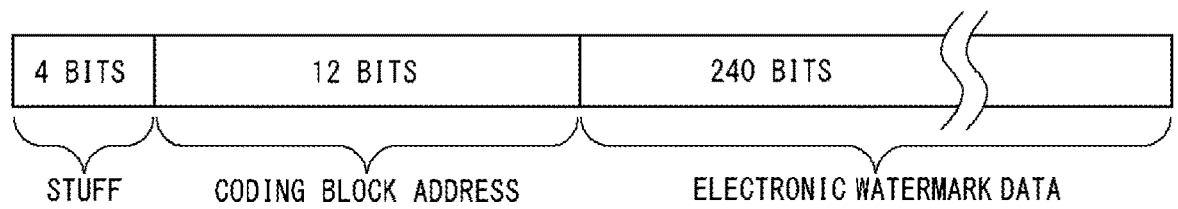
FIG. 10 shows an electronic watermark information set.

FIG. 10 shows an electronic watermark information set. The electronic watermark information set is comprised of 256 bits (32 bytes) that link 4 stuff bits, the 12-bit coding block address, and the 240-bit electronic watermark data.

The image coding unit 27 refers to the electronic watermark information set and selects the coding block targeted for embedding by referring to the coding block address. The image coding unit 27 embeds the electronic watermark data in the coding parameter used to code the selected coding block, codes the coding block of the image by using the coding parameter in accordance with the MPEG standard, and outputs an electronically watermarked coded image bitstream. In the case the electronic watermark data is embedded in the coding parameter used to code the coding block, that coding block is coded by using the coding parameter in which the electronic watermark data is embedded. It should therefore be noted that the image coding unit 27 also includes the electronic watermark embedding function.

Figure 3:
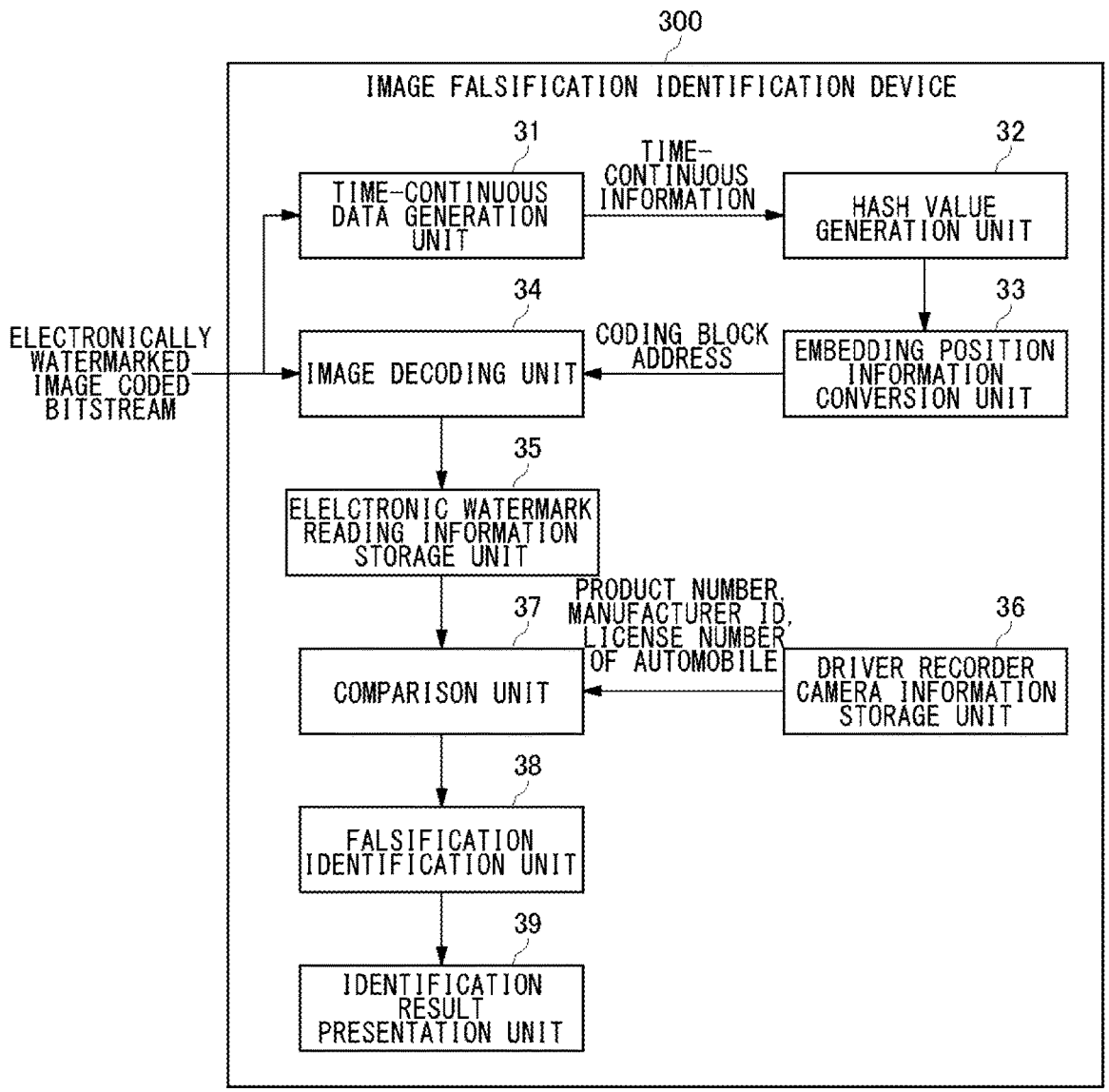
FIG. 3 shows a configuration of an image falsification identification device in which the electronic watermark according to the embodiment is used.

FIG. 3 shows a configuration of an image falsification identification device 300 in which the electronic watermark according to the embodiment is used.

The image falsification identification device 300 includes a time-continuous data generation unit 31, a hash value generation unit 32, an embedding position information conversion unit 33, an image decoding unit 34, a electronic watermark reading information storage unit 35, a drive recorder camera information storage unit 36, a comparison unit 37, a falsification identification unit 38, and an identification result presentation unit 39.

The electronically watermarked coded image bitstream in which the electronic watermark is embedded by the electronic watermark embedding device 200 of FIG. 2 is input to the image decoding unit 34. It should be noted that the image decoding unit 34 also has the function of interpreting an electronic watermark. Meanwhile, the electronically watermarked coded image bitstream is also input to the time-continuous data generation unit 31.

The time-continuous data generation unit 31, the hash value generation unit 32, and the embedding position information conversion unit 33 perform the same processes as those of the time-continuous data generation unit 22, the hash value generation unit 23, and the embedding position information conversion unit 24 of the electronic watermark embedding device 200 of FIG. 2, respectively.

The time-continuous data generation unit 31 generates time-continuous information based on the time code information on the input electronically watermarked coded image bitstream and supplies the time-continuous information to the hash value generation unit 32.

The hash value generation unit 32 refers to a hash table by using the time-continuous information as a key to generate a hash value and outputs the hash value to the embedding position information conversion unit 33.

The embedding position information conversion unit 33 converts a part of the input hash value into a coding block address. The coding block address represents embedding position information in an image for identifying a coding block in the image.

The embedding position information output from the embedding position information conversion unit 33 is supplied to the image decoding unit 34. The image decoding unit 34 extracts the electronic watermark data from the coding parameter of the coding block selected based on the embedding position information, while decoding the electronically watermarked coded image bitstream. The image decoding unit 34 saves the electronic watermark data in the electronic watermark reading information storage unit 35. The electronic watermark data saved in the electronic watermark reading information storage unit 35 is supplied to the comparison unit 37.

The drive recorder camera information storage unit 36 stores identification information such as the product number information on the product, the license number of the automobile in which the drive recorder is provided, which are assumed to form the electronic watermark data.

The comparison unit 37 finds an error between the extracted electronic watermark data and reference data and supplies the difference to the falsification identification unit 38. When the error is zero, the falsification identification unit 38 determines that falsification has not been made. When the error is not zero, the falsification identification unit 38 determines that falsification has been made or the digital data is broken. The falsification identification unit 38 supplies the result of determination to the identification result presentation unit 39. The identification result presentation unit 39 displays, for example, a message "falsified" or "not falsified" on a display, based on the input determination result.

A description will be given of a sequence of steps performed by the electronic watermark embedding device and the image falsification identification device having the above-described configuration. These steps can be implemented by hardware, by software, or by a combination of both.

Figure 4:
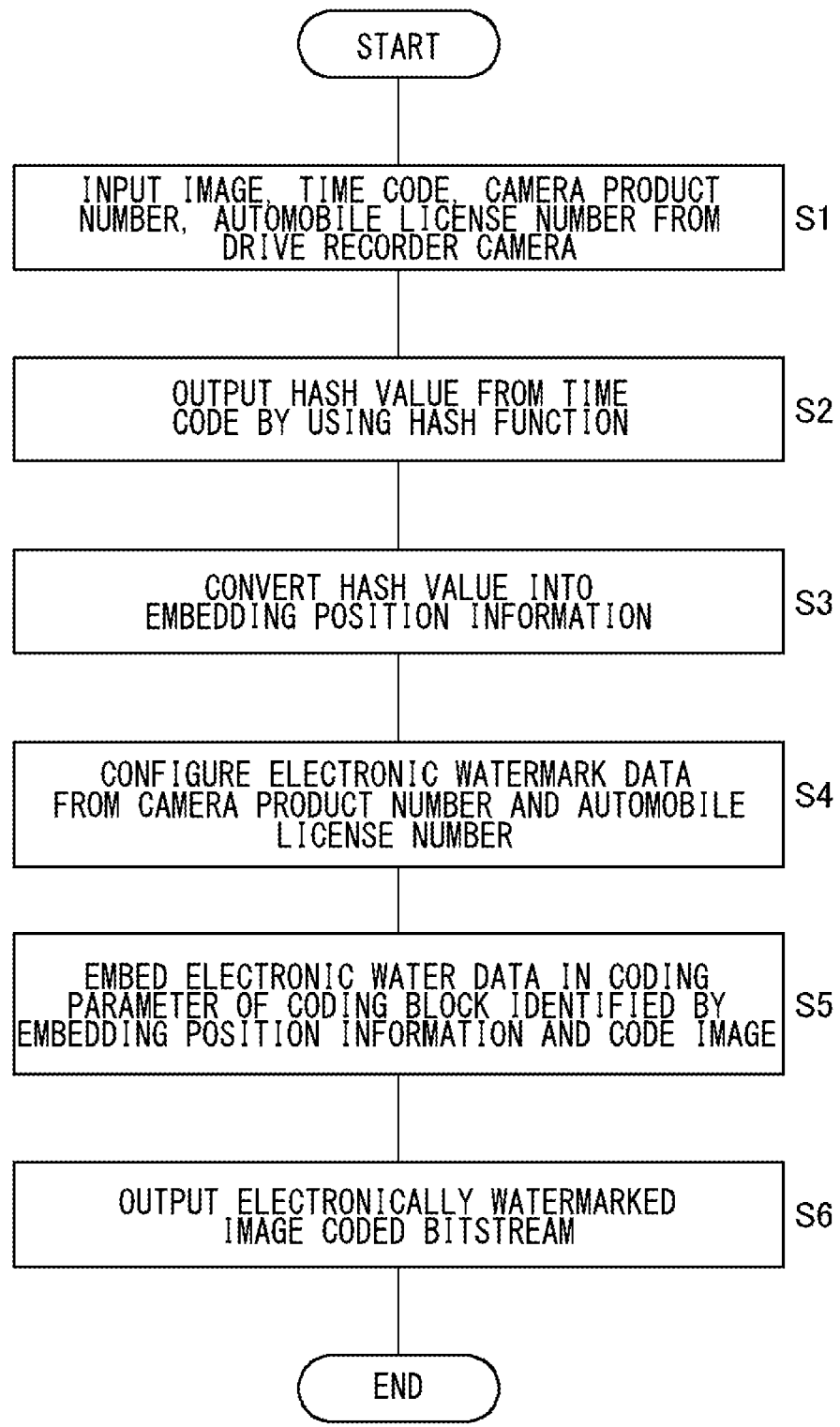
FIG. 4 is a flowchart showing a method of embedding an electronic watermark according to the embodiment.

FIG. 4 is a flowchart showing a method of embedding an electronic watermark according to the embodiment.

The image, the time code information, the product number of the drive recorder camera, and the license number of the automobile are input from the drive recorder camera 21 (step S1).

Time-continuous information incremented at each picture or each GOP subject to coding is generated from the time code information, and the time-continuous information is input to the hash function to output a hash value (step S2).

The generated hash value is converted into the embedding position information indicating a position in the image (step S3).

The product number of the camera and the license number information on the automobile are converted into binary data to configure M-bit electronic watermark data (step S4).

The image is coded by embedding the electronic watermark data configured in step S4 in the coding parameter of the coding block selected by referring to the embedding position information converted in step S3 (step S5).

More specifically, one pixel in the image is selected based on the embedding position information, and the coding block including that pixel is identified. The electronic watermark information each comprised of 1 bit is embedded in the coding parameter of a total of M coding blocks determined in the raster order according to a predetermined rule. The coding block is coded by using the coding parameter in which the electronic watermark information is embedded in this way.

The electronically watermarked coded image bitstream is output (step S6), and the process is terminated.

Figure 5:
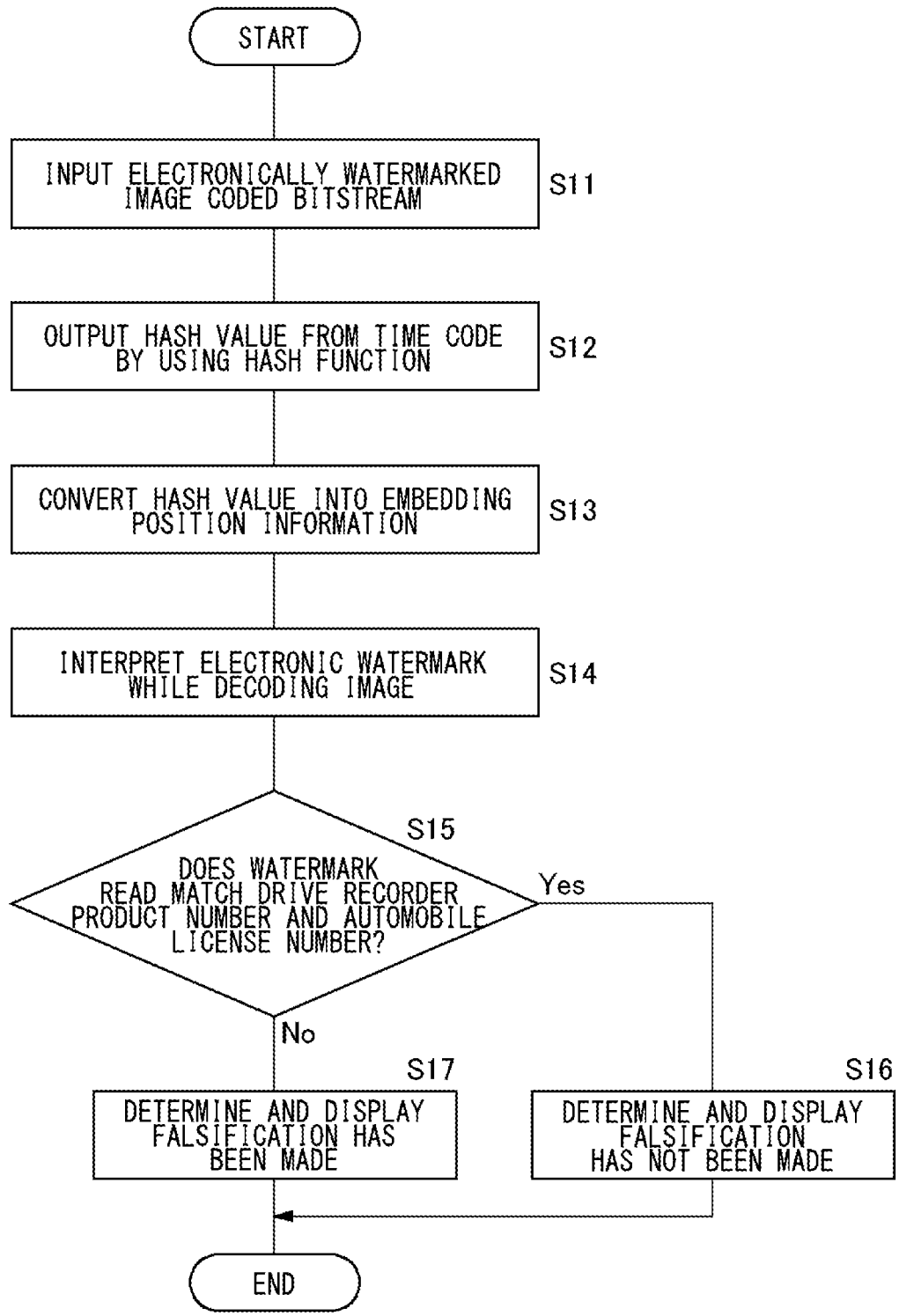
FIG. 5 is a flowchart showing a method of identifying image falsification using the electronic watermark according to the embodiment.
Figure 6:
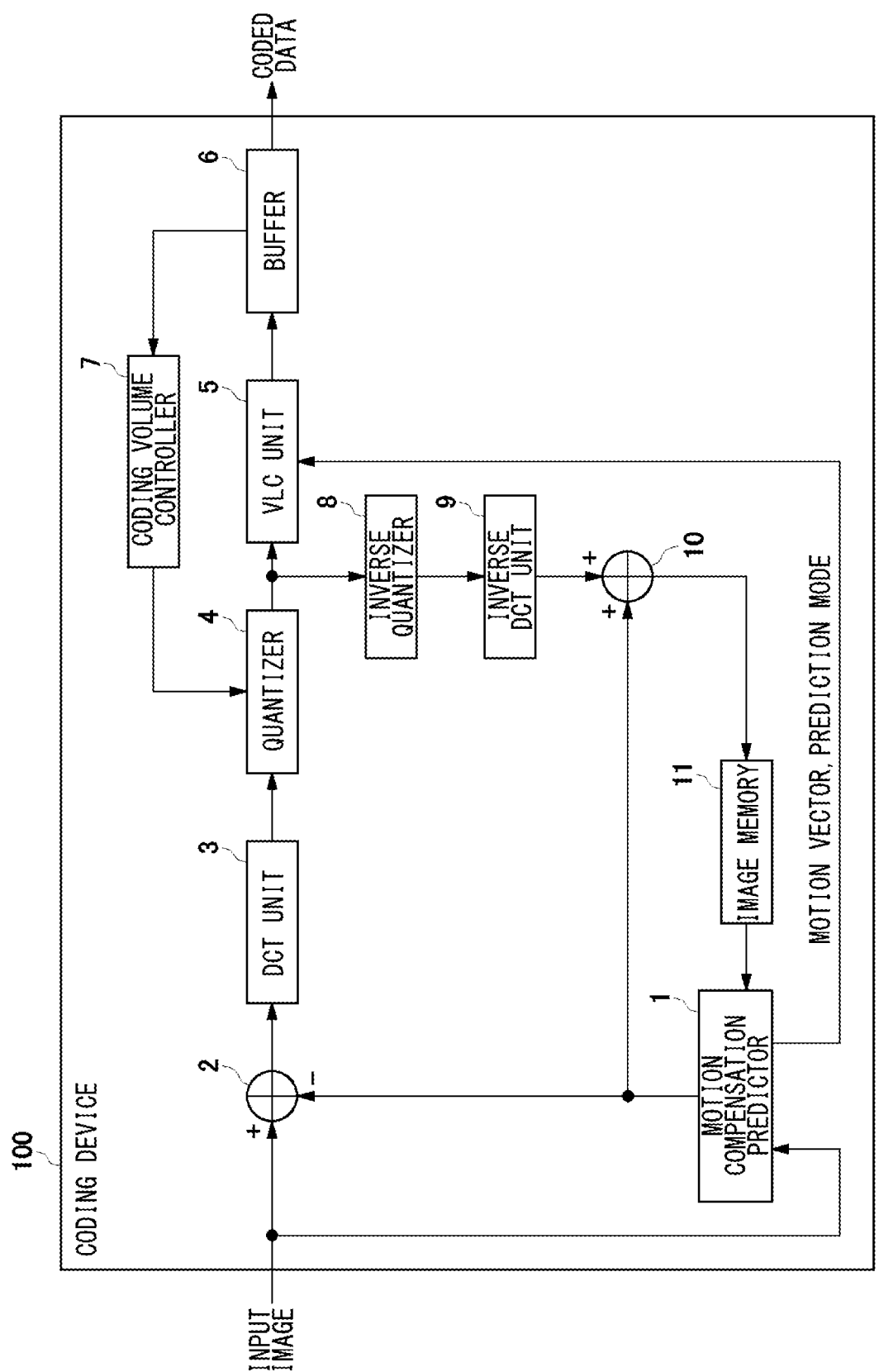
FIG. 6 shows a configuration of a related-art coding device adapted to code images according to the MPEG coding scheme.
Figure 7:
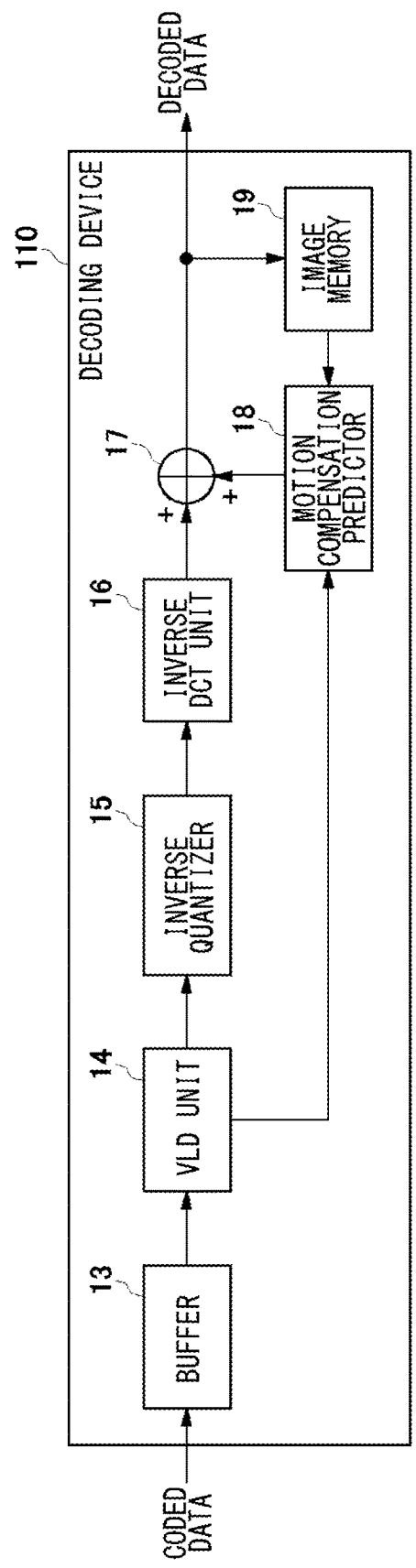
FIG. 7 shows a configuration of a related-art decoding device adapted to decode coded data subjected to MPEG coding.

FIG. 5 is a flowchart showing a method of identifying image falsification using the electronic watermark according to the embodiment.

The electronically watermarked coded image bitstream is input (step S11).

The time-continuous information is generated from the time code information of the electronically watermarked coded image bitstream, and the time-continuous information is input to the hash function to output the hash value (step S12).

The generated hash value is converted into the embedding position information indicating a position in the image (step S13).

As the image is being decoded, the electronic watermark is extracted from the coding parameter of the coding block selected by referring to the embedding position information and is interpreted (step S14).

The electronic watermark data thus read is compared with the reference data such as the product number information on the product, the license number of the automobile, etc. (step S15). When the electronic watermark data matches the reference data (Yes in step S15), a determination result "not falsified" is presented (step S16), and the process is terminated. When the electronic watermark data does not match the reference data (No in step S15), a determination result "falsified" is presented (step S17), and the process is terminated.

An illustrative method of embedding the electronic watermark data as the coding parameter of the coding block will now be described.

Two coding parameters, namely, the quantization scale and the motion vector, will be discussed by way of simple examples. The coding parameter in which the electronic watermark data is embedded is not limited to these parameters.

A 1-bit electronic watermark of "0" may be embedded in a quantization scale of an even number, and "1" in a quantization scale of an odd number. Alternatively, a 1-bit electronic watermark of "0" may be embedded when the horizontal vector value of a motion vector is an even number, and "1" may be embedded when the vector value is an odd number.

By determining such a rule tacitly, it is possible to embed electronic watermark data by using the coding parameter according to a standard such as MPEG and HEVC. A 1-bit (even number/odd number) electronic watermark is embedded in the coding parameter because it is known that a 1-bit shift in the value does not substantively result in visible deterioration in the ultimate decoded image. While it is possible to embed three values of 0, 1, and 2 that remain from division by 3, or to embed four values (2 bits) of 0, 1, 2, and 3 that remain from division by 4, it is known that such schemes result in poorer coding efficiency and a level of deterioration in the decoded image visible to human eyes. Thus, controlling the volume of information of electronic watermark data embedded in the coding parameter to 1 bit, i.e., either 0 or 1, is significant both in terms of coding efficiency and inhibition of deterioration in the decoded image.

As described above in the discussion of the related art, a disadvantage with the scheme of embedding an electronic watermark in a motion vector is that an electronic watermark cannot be embedded in a mode in which a motion vector is omitted. Thus, the embodiment defines it mandatory to use a macroblock mode in which a motion vector is recorded (not omitted) in the case of using information related to a motion vector to embed an electronic watermark. Similarly, in the case of using information related to quantization to embed an electronic watermark, a macroblock mode in which a quantization scale is mandatorily recorded (not omitted) is used.

A quantization scale is a scalar multiplication value used to quantize data derived from subjecting each macroblock to orthogonal transform, by dividing the data in a two-dimensional frequency domain. The absolute values of the quantization width varies depending on the type of MPEG standard. The values such as 1-31, 1-61, or the like are used. In the case of P pictures or B pictures in a certain specific condition, the value of a quantization scale may not be used. This is so in the case the data for a motion compensation error image subject to coding is substantially zero. In such a case, a NotCoded mode, in which a quantization scale is not used and the error image is not coded, is set for the relevant macroblock. In the NotCoded mode, an electronic watermark cannot be embedded in a quantization scale. This is addressed by making it mandatory not to use the NotCoded mode in the coding block selected by referring to the embedding position information described above and to code the coding block accordingly. For example, an intra mode is used instead of a mode that finds an error. This makes it mandatory to use a quantization scale. By controlling the quantization scale to be an even number of an odd number, embedding of an electronic watermark is ensured.

Modes available for each macroblock in P pictures and B pictures in MPEG2 include a mode in which a motion vector is used for motion compensation and for differential coding, and a mode in which intra coding is used instead of an error image when it is judged that no temporal correlation is identified and motion compensation cannot be performed. In the latter case, a motion vector is not used so that an electronic watermark cannot be embedded in a motion vector. This is addressed by setting a mode in which a motion vector is mandatorily used (forward prediction mode, backward prediction mode, or bidirectional prediction mode) in a coding block selected by referring to the embedding position information and by coding the block accordingly. In this case, it is highly likely that a prediction fails and that duplicated images are noticed in an error image, but then an adverse impact on the coding as a whole is extremely small since the scheme virtually produces a scene change between small-sized macroblocks. Our knowledge shows that a horizontal shift of a motion vector by 1 does not result in significant deterioration in the activity (complexity) of an error image signal that is visible to human eyes. It is therefore technically significant to configure an electronic watermark embedded in a motion vector as 1 bit (odd number/even number).

The example described herein is a simple example of MPEG2. In coding schemes such as H.264 and HEVC with a more advanced coding algorithm, other parameter are available for use in coding block. For example, an intra prediction mode is available. It is also possible to combine various modes. For example, selection between DCT and DFT, selection of a block size from 4×4, 4×8, 8×4, 8×8, 8×16, 16×8, and 16×16, and selection of a prediction method between a temporal direct mode and a spatial direct mode are available. A 1-bit level electronic watermark can be embedded in any of various coding parameters in a manner that deterioration in the image quality is inhibited.

The above embodiment assumes MPEG coding, but the embodiment can be applied to any coding scheme capable of changing a parameter in units of blocks within a picture plane.

The above-described processes can of course be implemented by hardware-based apparatus such as a CPU and a memory and can also be implemented by firmware stored in a read-only memory (ROM), a flash memory, etc., or by software on a computer, etc. The firmware program or the software program may be made available on, for example, a computer readable recording medium. Alternatively, the program may be made available from a server via a wired or wireless network. Still alternatively, the program may be made available in the form of data broadcast over terrestrial or satellite digital broadcast systems.

As described above, the embodiment provides the capabilities to change the embedding position based on time-continuous data on images coded by a coding scheme such as MPEG and to embed an electronic watermark accordingly. The embodiment also provides the capabilities to decode a picture from a coded stream in which time-continuous pictures are coded, detect electronic watermark information, and determine whether falsification has been made.

The position where an electronic watermark is embedded in the image changes randomly, which makes it difficult to interpret the electronic watermark and prevents falsification of the image. In the unlikely event that the electronic watermark information embedded is leaked, one cannot know where in the image the electronic watermark should be embedded so that the security is improved.

Further, since the embedding position is determined based on time-continuous information the continuity in the temporal direction can be certified depending on whether the electronic watermark is read from the embedding position. In other words, certification of both whether falsification has been made and whether the continuity in the temporal direction is observed can be made in a manner more secure than in the related-art method.

Since the embedding position is determined by using a one-way function based on the time-continuous information, even a temporal change in image pictures for one frame produces a significant change in the embedding position. Accordingly, the rule for determining the embedding position information itself cannot be predicted so that the security is improved.

The scheme according to the embodiment requires embedding an electronic watermark in units of coding blocks, i.e., the minimum unit of coding an image and so makes it possible to embed an electronic watermark in a coding parameter used to code a coding block (e.g., a parameter Thus, the scheme is advantageous both in terms of coding efficiency and inhibition of deterioration in the decoded image.

In the case of embedding an electronic watermark in information related to a motion vector, the coding block is set to a mode in which a motion vector is recorded (not omitted). In the case of embedding an electronic watermark in information related to quantization, the coding block is set to mode in which a quantization scale is recorded (not omitted). While this results in a slightly poorer coding efficiency depending on the number of coding blocks targeted for embedding of an electronic watermark, an electronic watermark can be embedded by mandatorily using a mode in which predictive coding is used or a mode in which quantization width is used.

The technology disclosed in JP2004-364263 solves the second problem in that an electronic watermark cannot be embedded in a prediction coded image itself, by embedding electronic watermark information in a header portion. However, the problem is revealed only on the condition that a mode of coding a prediction error image is set and only when an electronic watermark is embedded in an error signal from motion compensation.

To describe the point in further detail, MPEG defines a prediction mode in units of coding and offers three modes including a forward prediction mode, a backward prediction mode, a mode in which both a prediction in the forward direction and a prediction in the backward direction are used. There is also an intra mode used when a prediction fails, i.e., when the entropy of a prediction error image is very large. By generating the intra mode mandatorily in an image area where an electronic watermark should be embedded, the second problem above can be solved and an electronic watermark can be embedded in an error signal from motion compensation.

The motion vector disclosed in JP2004-364263 may be used to define two values indicating "in motion" and "not in motion" respectively, i.e., two values indicating "a motion vector has a value" and "a motion vector is zero" respectively, and the values may be embedded as electronic watermarks. Even in this case, one of the aforementioned four prediction modes that records a motion vector mandatorily, i.e., the forward prediction mode, may be mandatorily used in a portion of the image where an electronic watermark is embedded. Thereby, a motion vector is transmitted without fail to ensure that an electronic watermark can be embedded therein.

A picture may be an image captured by a vehicle-mounted camera. Electronic watermark information may be comprised of at least one of information related to the vehicle-mounted camera, information related to the automobile in which the vehicle-mounted camera is provided, and information related to the owner of the vehicle-mounted camera. The electronic watermark information such as this enables identifying the type (product number, etc.) or the manufacturer of the camera, identifying the license number of the automobile registered as carrying the camera, and identifying, for example, the telephone number of the owner of the camera. Embedding at least one these items of information as electronic watermark information makes it possible to certify whether the image has been falsified.

Given above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. An image coding device configured to code time-continuous pictures, comprising:
    an embedding position information conversion unit that converts a part of a second data into embedding position information indicating a coding block address for identifying a coding block in a picture, the second data being converted from a first data which is time-continuous information indicating time-continuity of the time-continuous pictures by a one-way hash function, wherein the time-continuous information is an incrementally counted continuous number using frame number of the coded pictures; and
    an image coding unit that selects a coding block in the picture based on the embedding position information, embeds electronic watermark information in a coding parameter used to code the coding block, and codes the coding block by using the coding parameter in which the electronic watermark information is embedded.

2. The image coding device according to claim 1, wherein in the case the coding parameter in which the electronic watermark information is embedded is information related to a motion vector, the coding unit mandatorily sets a mode in which a motion vector is used, in a coding block coded by the coding parameter in which the electronic watermark information is embedded.

3. The image coding device according to claim 1, wherein in the case the coding parameter in which the electronic watermark information is embedded is information related to quantization, the coding unit mandatorily sets a mode in which a quantization parameter is recorded, in a coding block coded by the coding parameter in which the electronic watermark information is embedded.

4. The image coding device according to claim 1, wherein the picture is an image captured by a vehicle-mounted camera, and the electronic watermark information includes at least one of information related to the vehicle-mounted camera, information related to the automobile in which the vehicle-mounted camera is provided, and information related to an owner of the vehicle-mounted camera.

5. An image coding method configured to code time-continuous pictures, comprising:
    converting a part of a second data into embedding position information indicating a coding block address for identifying a coding block in a picture, the second data being converted from a first data which is time-continuous information indicating time-continuity of the time-continuous pictures by a one-way hash function, wherein the time-continuous information is an incrementally counted continuous number using frame number of the coded pictures;
    selecting a coding block in the picture based on the embedding position information, embedding electronic watermark information in a coding parameter used to code the coding block, and coding the coding block by using the coding parameter in which the electronic watermark information is embedded.

6. A non-transitory recording medium encoded with an image falsification identification program configured to decode a picture from a coded bitstream in which time-continuous pictures are coded and detect electronic watermark information, and to identify whether falsification has been made, the image falsification identification program comprising computer-implemented modules including:
    an embedding position information conversion module that converts a part of a second data into embedding position information indicating a coding block address for identifying a coding block in a picture, the second data being converted from a first data which is time-continuous information indicating time-continuity of the time-continuous pictures by a one-way hash function, wherein the time-continuous information is an incrementally counted continuous number using frame number of the coded pictures;
    an electronic watermark information extraction module that selects a coding block in the picture based on the embedding position information and extracts the electronic watermark information from a coding parameter used to code the coding block; and
    a comparison and determination module that determines whether the picture has been falsified by comparing the extracted electronic watermark information with reference information.

* * * * *